US010216990B2

(12) United States Patent
Biswal et al.

(10) Patent No.: US 10,216,990 B2
(45) Date of Patent: Feb. 26, 2019

(54) SELECTION OF MACHINE-READABLE LINK TYPE (71) Applicant: Hewlett-Packard Development Company, L.P., Houston, TX (US)

(72) Inventors: Bibhu Prasad Biswal, Bangalore (IN); Sibin Jos Koothur, Bangalore (IN); Sandeep Matti Prabhu, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 226 days.

(21) Appl. No.: 15/327,937

(22) PCT Filed: Jan. 22, 2015

(86) PCT No.: PCT/US2015/012431
§ 371 (c)(1),
(2) Date: Jan. 20, 2017

(87) PCT Pub. No.: WO2016/018458
PCT Pub. Date: Feb. 4, 2016

(65) Prior Publication Data
US 2017/0206408 A1 Jul. 20, 2017

(30) Foreign Application Priority Data
Jul. 30, 2014 (IN) .......................... 3726/CHE/2014

(51) Int. Cl.
G06K 9/00 (2006.01)
G06K 7/14 (2006.01)
(Continued)

(52) U.S. Cl.
CPC ....... *G06K 9/00456* (2013.01); *G06K 7/1413* (2013.01); *G06K 9/00463* (2013.01);
(Continued)

(58) Field of Classification Search
CPC combination set(s) only.
See application file for complete search history.

(56) References Cited

U.S. PATENT DOCUMENTS 6,647,130 B2 11/2003 Rhoads
7,543,758 B2 6/2009 Dymetman et al.
(Continued)

FOREIGN PATENT DOCUMENTS

WO WO-2004051917 6/2004
WO WO-2007003008 1/2007
WO WO-2013056340 4/2013

OTHER PUBLICATIONS

"Understanding Graphics/Images," (WEB)Jul. 18, 2014, 11 pages <http://bc065.k12.sd.us/Multimedia/.
(Continued)

*Primary Examiner* — Alex Kok S Liew
(74) *Attorney, Agent, or Firm* — HP Inc. Patent Department (57) ABSTRACT

Examples disclosed herein relate to selection of machine-readable link type. Examples include acquisition of an electronic document, selection of a machine-readable link type for evaluation, and a decision of whether at least one characteristic of the document satisfies at least one evaluation metric for use of the selected type of machine-readable link.

15 Claims, 5 Drawing Sheets

(51) Int. Cl.
　　　*G06K 19/06*　　　(2006.01)
　　　*G06T 1/00*　　　(2006.01)
　　　*H04N 1/32*　　　(2006.01)

(52) U.S. Cl.
　　　CPC ... *G06K 9/00469* (2013.01); *G06K 19/06028* (2013.01); *G06T 1/0028* (2013.01); *H04N 1/32251* (2013.01)

(56) References Cited

U.S. PATENT DOCUMENTS

| | | | |
|---|---|---|---|
| 7,988,050 | B2 | 8/2011 | Kitada et al. |
| 8,180,844 | B1 | 5/2012 | Rhoads et al. |
| 8,189,863 | B1 | 5/2012 | Rucklidge |
| 8,447,066 | B2 | 5/2013 | King et al. |
| 2003/0147549 | A1* | 8/2003 | Choi ............... G06T 1/0021 382/100 |
| 2003/0223616 | A1* | 12/2003 | D'Amato ......... G03H 1/0011 382/100 |
| 2004/0223197 | A1* | 11/2004 | Ohta .............. G06F 17/30271 358/538 |
| 2006/0039580 | A1* | 2/2006 | Moon .............. G06T 1/0021 382/100 |
| 2008/0149713 | A1 | 6/2008 | Brudage |
| 2009/0324100 | A1 | 12/2009 | Kletter et al. |
| 2011/0069328 | A1 | 3/2011 | Ulichney et al. |
| 2012/0130794 | A1 | 5/2012 | Strieder |
| 2013/0112760 | A1 | 5/2013 | Schory et al. |
| 2013/0166418 | A1 | 6/2013 | Wolf |
| 2014/0108963 | A1 | 4/2014 | Black et al. |
| 2014/0177006 | A1 | 6/2014 | Sirigiri et al. |

OTHER PUBLICATIONS

Aurasma, "Auras," available Jul. 18, 2014, <http://www.aurasma.com/aura/>. 2 pages.

Carter, S. et al., "Linking Digital Media to Physical Documents: Comparing Content- and Marker-based Tags," Apr./Jun. 2010, IEEE Pervasive Computing, V9/N2, pp. 46-55.

Digimarc, "About Digital Watermarking," available Jul. 18, 2014, 2 pages <http://www.digimarc.com/technology/about-digital-watermarking>.

Digital Watermarking Alliance, "How Digital Watermarking Works" Jul. 26, 2014, <http://www.digitalwatermarkingalliance.org/dwm.asp>. 1 page.

Fan et al., "Marginal noise removal of document images," Proceedings, Sixth International Conference on Document Analysis and Recognition, 2001, pp. 317-321.

Gary C. Kessler, "File Signatures Table," Jul. 14, 2014, 52 pages <http://www.garykessler.net/library/file_sigs.html>.

Haralick et al., "Textural features for image classification," IEEE Transactions on Systems, Man and Cybernetics, vol. SMC-3, No. 6, Nov. 1973, pp. 610-621.

Hewlett-Packard Development Company, L.P., What is HP Connected?, Jul. 18, 2014, <https://www.hpconnected.com/whatishpc>, 3 pages.

Mingqiang et al., "A survey of shape feature extraction techniques," Pattern Recognition, 2008, pp. 43-90, <http://hal.archives-ouvertes.fr/docs.

Ray Smith, "A Simple and Efficient Skew Detection Algorithm via Text Row Algorithm," Dec. 1994, <http://www.hpl.hp.com/techreports/94/HPL-94-113.pdf>, 9 pages.

Reed et al., "Adaptive Color Watermarking," ~ Jul. 26, 2014, <http://www.digimarc.com/ ~ 8 pages.

Shafait et al., "Document cleanup using page frame detection," Sep. 30, 2008, IJDAR (2008) 11:81-96, http://iupr1.cs.uni-kl.de.

Wikipedia, "Augmented reality," Jul. 7, 2014, <http://en.wikipedia.org/wiki/Augmented_reality>, 22 pages.

Wikipedia, "Aurasma," May 6, 2014, <http://en.wikipedia.org/wiki/Aurasma> 2 pages.

Wikipedia, "Barcode," Jul. 18, 2014, <http://en.wikipedia.org/wiki/Barcode>, 20 pages.

Wikipedia, "HP ePrint," Jun. 22, 2014, <http://en.wikipedia.org/wiki/HP_ePrint>, 8 pages.

Wikipedia, "List of file signatures," Jul. 24, 2014 <http://en.wikipedia.org/wiki/List_of_file_signatures>, 7 pages.

Wikipedia, "Magic number (programming)," Jul. 6, 2014. <http://en.wikipedia.org/wiki/Magic_number_(programming)>, 11 pages.

Wikipedia, "QR Code," Jul. 12, 2014 <http://en.wikipedia.org/wiki/QR_code>, ~ 19 pages.

* cited by examiner

SELECTION OF MACHINE-READABLE LINK TYPE

BACKGROUND

Various types of machine-readable links, such as one- or two-dimensional barcodes, digital watermarks, image fingerprints, and the like, may be optically readable by a computing device with an image capture device. Such machine-readable links may be encoded or associated with various types of information. In some examples, a machine-readable link may be encoded or associated with information identifying content accessible over a computer network.

BRIEF DESCRIPTION OF THE DRAWINGS

The following detailed description references the drawings, wherein.

DETAILED DESCRIPTION

As noted above, a machine-readable link may be encoded or associated with information identifying content accessible over a computer network. For example, a computing device may optically capture the machine-readable link having with an image capture device (e.g., a digital camera, or the like) and then communicate with a linking service to access content (e.g., a video, a website, etc.) associated with the machine-readable link by the linking service.

As noted above, there are various types of machine-readable links, such as, for example, one- and two-dimensional barcodes, digital watermarks, image fingerprints, and the like. In some examples, a link creator may manually select which of the various types of machine-readable link to use with a particular document. However, such selection processes may be cumbersome, or may inhibit automated workflows.

To address these issues, examples described herein include automated determination of an appropriate type of machine-readable link to use with a given document based on characteristic(s) of the document. Examples described herein may acquire a document in an electronic format, select one of an overt type and a covert type of machine-readable link for evaluation based on whether the document is a textual-type document or an image-type document, and decide whether the document satisfies at least one evaluation metric for use of the selected type of machine-readable link based on at least one characteristic of the content of the document. Such examples may further determine to produce a first linked version of the document using a machine-readable link of the selected type embodied in the first linked version based on the document satisfying the at least one evaluation metric, and may determine to produce a second linked version of the document using a machine-readable link of the non-selected type embodied in the second linked version based at least in part on the document not satisfying the at least one evaluation metric.

In this manner, examples described herein may utilize various document characteristics, such as document type and characteristics of the content of the document, to determine an appropriate type of machine-readable link to use with a given document to produce a linked version of the document. In such examples, the linked version may be produced using a machine-readable link of the determined type embodied in the linked version of the document and such that associated payoff content is accessible through a linking service via optically capturing at least a portion of the linked version.

Figure 1:
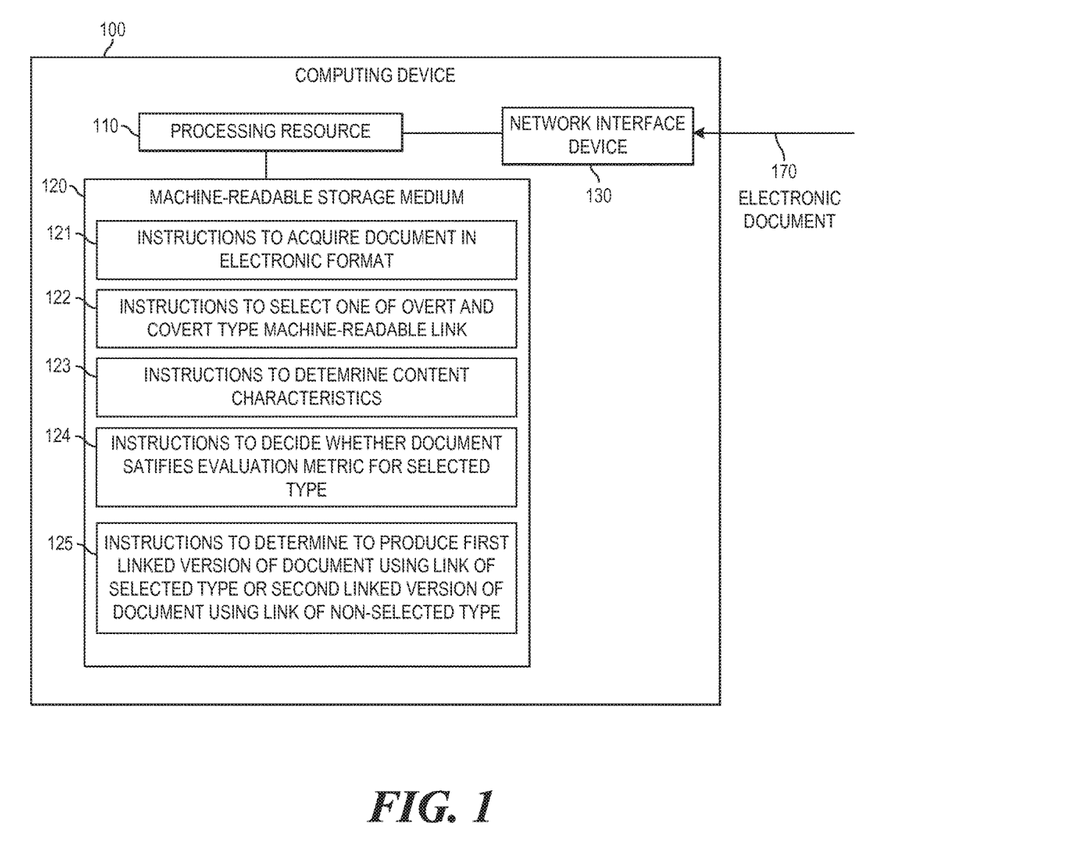
FIG. 1 is a block diagram of an example computing device to select one of an overt type and a covert type of machine-readable link based on a document type.

Referring now to the drawings, FIG. 1 is a block diagram of an example computing device 100 to select one of an overt type and a covert type of machine-readable link based on a document type. In the example of FIG. 1, computing device 100 includes a processing resource 110 and a machine-readable storage medium 120 comprising (e.g., encoded with) instructions 121-125 executable by processing resource 110. In some examples, storage medium 120 may include additional instructions. In other examples, the functionalities described herein in relation to instructions 121-125, and any additional instructions described herein in relation to storage medium 120, may be implemented as engines comprising any combination of hardware and programming to implement the functionalities of the engines, as described below.

As used herein, a "computing device" may be a desktop computer, laptop (or notebook) computer, workstation, tablet computer, mobile phone, smart device, server, blade enclosure, or any other processing device or equipment. In examples described herein, a processing resource may include, for example, one processor or multiple processors included in a single computing device or distributed across multiple computing devices. In the example of FIG. 1, computing device 100 includes a network interface device 130.

Figure 2:
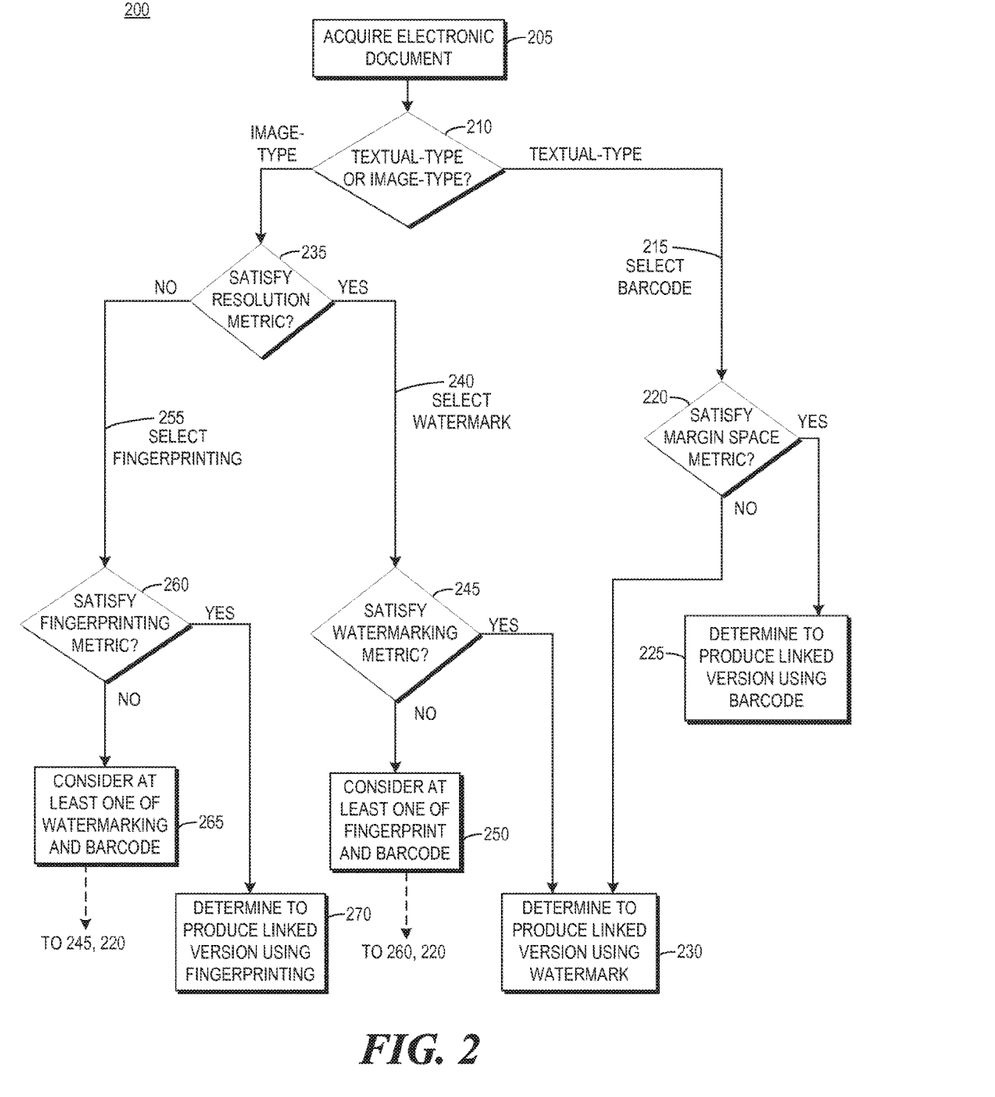
FIG. 2 is a flowchart of an example method for determining a type of machine-readable link to use in producing a linked version of an electronic document.

For ease of understanding, examples of automated determination of an appropriate type of machine-readable link to use with a given document based on characteristic(s) of the document will be described herein in relation to FIGS. 1 and 2. FIG. 2 is a flowchart of an example method 200 for determining a type of machine-readable link to use in producing a linked version of an electronic document. However, in some examples, computing device 100 of FIG. 1 may perform other methods different than the method 200 of FIG. 2 or a subset of method 200, and method 200 of FIG. 2 may be performed by computing device(s) or system(s) other than computing device 100 of FIG. 1. Examples described in relation to FIGS. 1 and 2 may perform automated determination of an appropriate type of machine-readable link to use with a particular document, among a plurality of types of machine-readable link including barcodes, digital watermarks, and image fingerprints.

In examples described herein, a "machine-readable link" (or "optically machine-readable link") may be an image associated with a linking service that is optically readable by a computing device using an image capture device (e.g., a digital camera, or the like) to determine payload information with which the computing device may obtain access to a digital content payoff assigned to the image in the linking service. Example types of machine-readable links include barcodes (e.g., a one-dimensional barcode, two-dimensional barcode, matrix barcode, QUICK RESPONSE CODE (QR CODE), or the like), digital watermarks, image fingerprints, and the like. In some examples, each type of machine-readable link in a document may be resolved (e.g., the payload information may be determined therefrom) without comparison of the document to any other version of the document.

In the example of FIG. 1, instructions 121 may actively acquire (e.g., retrieve, etc.) or passively acquire (e.g., receive, etc.) a document 170 in an electronic format via network interface device 130 of computing device 100 (see 205 of method 200). In such examples, the instructions 121 may acquire document 170 from network interface device 130 directly, or indirectly (e.g., via one or more intervening components, services, processes, or the like, or a combination thereof).

At 210 of method 200, instructions 122 may determine whether document 170 is a textual-type document or an image-type document. In examples described herein, a "textual-type document" is a type of electronic document readily utilized for conveying and manipulating text. In some examples described herein, a system or computing device may define which types of documents are to be considered textual-type documents by maintaining a list of file formats for such documents (e.g., a word processing format, a spreadsheet file format, portable document format (PDF), etc.), where documents in those file formats are to be considered textual-type documents. In examples described herein, an "image-type document" is a type of electronic document readily utilized for conveying and manipulating images. In some examples described herein, a system or computing device may define which types of documents are to be considered image-type documents by maintaining a list of file formats for such documents (e.g., JPEG, PNG, TIFF, etc.), where documents in those file formats are to be considered textual-type documents.

In such examples, instructions 122 may determine whether document 170 is a textual-type document or an image-type document based on the file format of document 170. For example, instructions 122 may determine the file format of document 170 in any suitable manner (e.g., based on the file extension, file signature (or magic number) at the beginning of the document, or the like), and then determine the document type based on a comparison of the document type with at least one of a file format list for textual-type documents and a file format list for image-type documents. In such examples, instructions 122 may determine that document 170 is a textual-type document if the file format is at least one of in the list of textual-type file formats and not in the list of image-type file formats, and may determine that document 170 is an image-type document if the file format is at least one of in the list of image-type file formats and not in the list of textual-type file formats.

Instructions 122 may select one of an overt type and a covert type of machine-readable link for evaluation based at least in part on whether document 170 is a textual-type document or an image-type document. In some examples, the selection may comprise a selection of evaluation metric(s) for a particular type of machine-readable link to compare against characteristics of the content of document 170. In examples described herein, an "overt type" of machine-readable link is a type of machine-readable link that is readily observable by the naked eye. Examples of overt types of machine-readable link include barcodes, such as one-dimensional barcodes, two-dimensional barcodes, matrix barcodes, QR CODES, and the like. In examples described herein, a "covert type" of machine-readable link is a type of machine-readable link that is not readily observable by the naked eye. Examples of covert types of machine-readable link include digital watermarks, image fingerprints, and the like.

Instructions 123 may determine characteristics of the content of document 170. In some examples, the particular characteristics determined may depend on the which type of machine-readable link was selected. For example, the selected type is a digital watermark, instructions 123 may determine a tonal distribution for the content of document 170, as described in more detail below. In examples described herein, the "content" of a document may include data to be displayed when the file is opened with an appropriate viewing or editing computer application, and may exclude metadata for the document (e.g., file extension, header information, magic number, attributes, etc.).

After the selection, instructions 124 may decide whether the determined characteristics of document 170 satisfy at least one evaluation metric for use of the selected type of machine-readable link. If so, then based on the satisfaction of the at least one evaluation metric, instructions 125 may determine to produce a linked version of document using a machine-readable link of the selected type embodied in the linked version of the document such that associated payoff content is accessible via optically capturing at least a portion of the linked version of the document. If not, then based at least in part on the non-satisfaction of the at least one evaluation metric, instructions 125 may determine to produce a linked version of the document using a machine-readable link of the non-selected type embodied in the linked version of the document such that associated payoff content is accessible via optically capturing at least a portion of the second version of the document.

Referring to FIGS. 1 and 2, in some examples, at 210 of method 200, instructions 122 may determine that document 170 is a textual-type document and, based on that determination, may select an overt type of machine-readable link for evaluation, such as any type of barcode (see 215 of method 200). In such examples, at 220 of method 200, instructions 123 may determine characteristics of the content of document 170 relevant to use of a barcode, and instructions 124 may decide whether the characteristics satisfy at least one evaluation metric for use of the selected type of machine-readable link (i.e., a barcode). In some examples, the characteristic(s) may include the respective dimensions of area(s) of white space in margins (or borders) of the content of document 170. In such examples, an evaluation metric for barcodes may include target dimensions for a barcode, wherein the evaluation metric is satisfied when the margin(s) of document 170 include at least one area of white space having respective dimensions (e.g., height and width) at least as large as respective target dimensions (e.g., height and width) for a barcode. In such examples, the target dimensions may be predefined by computing device 100. As an example, the target dimensions may be a height of 100 pixels and a width of 100 pixels. In other examples, any other suitable target dimensions may be used (e.g., 105×105 pixels, etc.).

In such examples, instructions 123 may identify the margins of the content of document 170 using any suitable page frame detection technique. Instructions 124 may then determine whether, for any area of white space in the margins of the content, the dimensions of the area are at least as large as the target dimensions for a barcode. In some examples, when that is determined to be true, instructions 124 may determine that the characteristics of the content of document 170 satisfy the evaluation metric for barcodes.

In some examples, the characteristics of the content of document 170 may also include the skew angle of the content of document 170. In such examples, an additional evaluation metric for a barcode may include a skew angle threshold above which barcodes may not be used, and which is satisfied by a document having content with a determined skew angle less than the threshold. In such examples, instructions 123 may determine the skew angle of document content with any suitable technique. In some examples, instructions 124 may determine that the evaluation metrics for use of the barcode are satisfied based on a determining that both the skew angle and target dimension metrics are satisfied.

Based on the satisfaction of the barcode evaluation metric(s) by the characteristics of the content of document 170, at 225 of method 200, instructions 125 may determine to produce a linked version of the document comprising a barcode (i.e., the selected type of machine-readable link) such that associated payoff content is accessible through a linking service via optically capturing the barcode in the linked version.

In examples described herein, a "linking service" may be a service implemented by one or more networked computing devices to create and manage optically machine-readable links, and to create and manage the assignment of digital content payoffs to respective optically machine-readable links. In some examples, a linking service may provide a computing device access to a digital content payoff assigned to a given optically machine-readable link in response to an indication that the computing device has captured an image of the given optically machine-readable link. In examples described herein, a "content payoff" (or "digital content payoff") may be any suitable type of information that may be accessed (e.g., retrieved, viewed, etc.) over a computer network, such as a digital video, a website or webpage, a uniform resource identifier (URI) (such as a uniform resource locator (URL)) for web content (e.g., a website), or the like.

In some examples, instructions 125 may determine that a linked version of document 170 be produced with a barcode added to the document, where the barcode encodes payload information registered in the linking services such that, in response to receiving an indication that a computing device has captured an image of the barcode (e.g., via receipt of the payload from the computing device), the linking service may return to the computing device any payoff content associated with the barcode payload information in the linking service. In some examples, payoff content may be associated with a payload when the payload is first registered in the linking service. In some examples, the payoff content associated with a particular payload may be changed at a later time, such that the payload is associated with different payoff content.

In some examples, instructions 125 may directly or indirectly communicate the determination to produce the linked version including the barcode to another system, component, functionality, or the like, (e.g., the linking service) to create the determined linked version from document 170. In some examples. Instructions 125 may further determine an area at which to place the barcode (which may be communicated as well), the area having dimensions at least as large as the target dimensions.

In other examples, at 220 of method 200, instructions 124 may determine that the characteristics of the content of document 170 do not satisfy at least one of the evaluation metric(s) for use of a barcode. For example, instructions 124 may determine that a plurality of areas of white space in the margins of the content of document 170 each have respective dimensions that are smaller (in at least one dimension) than the target dimensions. Based on this determination, at 230 of method 200, instructions 125 may determine to produce a linked version of the document comprising a non-selected type of machine-readable link. For example, instructions 125 may determine to produce a linked version of the document comprising a digitally watermarked region of greyscale tint (e.g., a watermarked region of grey color) through which associated payoff content is accessible through the linking service via optically capturing the digitally watermarked region. In some examples, instructions 125 may directly or indirectly communicate the determination to produce the linked version including the barcode to another system, component, functionality, or the like, to create the determined linked version from document 170.

In examples described herein, digital watermarking refers to any suitable technique for altering the data of an image (e.g., values of the color components of pixels of an image such as RGB values, etc.) to embed a payload in the image such that a computing device may determine the payload from a captured image (e.g., digital photograph) of the altered image, but the change to the altered image is not readily perceptible to the naked eye.

Returning to 210 of method 200, in other examples, instructions 122 may select a covert type of machine-readable link for evaluation based at least in part on the document being an image-type document. In some examples, instructions 122 may select one of a plurality of covert types of machine-readable link based on document 170 being an image-type document and based on whether the content of document 170 satisfies a resolution evaluation metric (see 235 of method 200). In such examples, instructions 122 may determine a resolution of the content of document 170 and determine whether the resolution satisfies the resolution evaluation metric, which may be a resolution threshold. For example, the resolution threshold may indicate a target resolution below which digital watermarking may not be selected. In such examples, instructions 122 may determine that the content of document 170 satisfies the resolution evaluation metric when the determined resolution is greater than or equal to the resolution threshold, and may determine that the content of document 170 does not satisfy the resolution evaluation metric when the determined resolution is less than the resolution threshold. In some examples, the resolution threshold may be 72 dots per inch (DPI), or another suitable resolution.

In some examples, instructions 122 may determine, at 210 of method 200, that document 170 is an image-type document and may determine, at 235 of method 200, that the resolution of the content of document 170 satisfies the resolution evaluation metric. Based on those determinations, instructions 122 may select digital watermarking for evaluation (240 of method 200). In such examples, at 245 of method 200, instructions 123 may determine characteristics of the content of document 170 that are relevant to digital watermarking, including a tonal distribution for the content of document 170, and instructions 124 may decide whether the determined characteristics satisfy watermarking evaluation metric(s) for use of digital watermarking.

The tonal distribution determined by instructions 123 may include information identifying, for each brightness value in the tonal range of the content, the number of pixels of the content having that brightness value, which instructions 123 may determine from the content of document 170.

In such examples, the watermarking evaluation metrics may relate to the tonal distribution of the content. For example, the tonal range of the content may be partitioned into a lower range "L" including the lowest 20% of the tonal range, a middle range "M" including the middle 60% of the tonal range, and an upper range "U" including the highest 20% of the tonal range, where the lower, middle, and upper ranges are non-overlapping, and the middle range is between the upper and lower ranges. In such examples, a first watermarking metric may be based on the distribution of the pixels between the different ranges. For example, whether the number of pixels in middle range M (represented as "p(M)") is greater than the number of pixels in the upper range (represented as "p(U)") and the number of pixels in the lower range (represented as "p(L)") combined (i.e., whether p(M)>p(L)+p(U)). Instructions 124 may decide that the first watermarking metric is satisfied when the determined tonal distribution for the content of document 170 satisfies this relationship, and otherwise not.

A second watermarking metric may be, for example, whether more than 80% of the pixels in the content are distributed across at least 30% of the different values in the tonal range. Instructions 124 may decide that the second watermarking metric is satisfied when the determined tonal distribution for the content of document 170 satisfies this relationship, and otherwise not.

In such examples, instructions 124 may decide that the characteristics of the content of document 170 satisfy the watermarking evaluation metric(s) for the use of digital watermarking when instructions 124 decide that at least the first and second watermarking evaluation metrics are satisfied. In other examples, instructions 124 may decide that the characteristics of the content of document 170 satisfy the watermarking evaluation metric(s) for the use of digital watermarking when instructions 124 decide that at least the first watermarking evaluation metric is satisfied.

Based on instructions 124 deciding that the watermarking evaluation metrics are satisfied as described above, then at 230 of method 200, instructions 125 may determine to produce a linked version of the document using a digital watermark embodied in the linked version such that associated payoff content is accessible via optically capturing at least the portion of the linked version of the document including the digital watermark. In some examples, based on instructions 124 deciding that the watermarking evaluation metrics are not satisfied as described above (see 250 of method 200), then instructions 123 and 124 may proceed to 260 to determine whether fingerprinting evaluation metric(s) are satisfied, as described below, for use of an image fingerprint (i.e., a non-selected type) if so, and if not may proceed to 220 to determine whether barcode evaluation metric(s) are satisfied, as described above, for use of a barcode (i.e., a non-selected type) if so.

In other examples, image fingerprinting may be the selected for evaluation. In examples described herein, image fingerprinting is a technique for generating an "image fingerprint" comprising information representing characteristic aspects of the image, such as features depicted in the image (e.g., object(s) or portions thereof), color(s), texture(s), noise, correlations between features of the image, or the like, or a combination thereof. In such examples, an image fingerprint may be generated based on the original image (document) itself, without modification. When utilizing an image fingerprint type machine-readable link, an image fingerprint is generated to represent the image. This image fingerprint may be unique to the image, or otherwise distinctly represent the image such that it is different than image fingerprints for at least a large number of different images. Since the image fingerprint represents (and may be generated from) the content of the image, the image fingerprint is embodied in the image.

When used as a machine-readable link for a document, an image fingerprint may be generated from the image and registered in a linking service, as described above, such that the linking service, in response to receiving an indication that a computing device has captured an image of the document content (e.g., via receipt of the image or the image fingerprint generated from the image from the computing device), may return to the computing device any payoff content associated with the image fingerprint in the linking service. In such examples, the computing device may generate the image fingerprint from the captured image, or the linking service may generate the fingerprint from the image received from the computing device.

Referring again to FIGS. 1 and 2, in some examples, instructions 122 may determine, at 210 of method 200, that document 170 is an image-type document and may determine, at 235 of method 200, that the resolution of the content of document 170 does not satisfy the resolution evaluation metric. Based on those determinations, instructions 122 may select image fingerprinting for evaluation (255 of method 200).

In such examples, at 260 of method 200, instructions 123 may determine characteristics of the content of document 170 that are relevant to image fingerprinting, including a number of features represented in the image of document 170, and instructions 124 may decide whether the determined characteristics satisfy fingerprinting evaluation metric(s) for use of image fingerprinting.

For example, instructions 123 may determine a number of features that can be identified in the image using any suitable technique. In some examples, instructions 123 may determine how many features can be identified in the image using a scale-invariant feature transform (SIFT) technique. In such examples, a fingerprinting evaluation metric may include a threshold number of features identified from content of a document. In such examples, the fingerprinting evaluation metric may be satisfied when at least the threshold number of features are identified in the content of the document. In some examples, the threshold may be a pre-defined or default value specified by computing device 100. In other examples, the threshold may be a configurable value (e.g., a parameter specified by a user, etc.).

In such examples, instructions 123 may determine characteristics of the content of document 170, including the number of identifiable features in the content, and instructions 124 may decide that fingerprinting evaluation metric(s) are satisfied when at least the number of features identified in the content is greater than or equal to the threshold number, and may otherwise determine that the fingerprinting evaluation metric(s) are not satisfied.

Based on instructions 124 deciding that the fingerprinting evaluation metric(s) are satisfied as described above, then at 270 of method 200, instructions 125 may determine to produce a linked version of the document using an image fingerprint embodied in the linked version such that associated payoff content is accessible via optically capturing at least the portion of the linked version of the document embodying the image fingerprint the digital watermark. In such examples, the linked version may be document 170 itself (without modification), with the image fingerprint generated from the content of document 170 being registered in the linking system.

In some examples, based on instructions 124 deciding that the image fingerprinting evaluation metrics are not satisfied as described above (see 265 of method 200), then instructions 123 and 124 may proceed to 245 to determine whether watermarking evaluation metric(s) are satisfied, as described above, for use of a digital watermark (i.e., a non-selected type) if so, and if not may proceed to 220 to determine whether barcode evaluation metric(s) are satisfied, as described above, for use of a barcode (i.e., non-selected type) if so.

In examples described herein, different "types" of machine-readable link may be types of machine-readable link that are parsed, read, analyzed, or otherwise interpreted to determine payload information in different ways or using different techniques, or the like. For example, barcodes, digital watermarks, and image fingerprints are each different types of machine-readable link in examples described herein.

In some examples, an optically machine-readable link, such as a barcode, may comprise the payload information encoded or embedded therein. In some examples, a machine-readable link such as digital watermark may comprise the payload information encoded or embedded in a carrier image. In such examples, a computing device using an image capture device may determine, acquire, etc., the payload information by decoding, parsing, etc., the link in accordance with the manner in which the information is encoded or embedded in the link. In other examples, a target image may not contain encoded or embedded payload information. In such examples, a computing device using an image capture device may determine, acquire, etc., the payload information based on features, characteristics, or other aspects of the target image itself, or the like, or a combination thereof.

In examples described herein, a "network interface device" may be a hardware device to communicate over at least one computer network. In some examples, a network interface may be a network interface card (NIC) or the like. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media is part of an article (or article of manufacture). An article or article of manufacture may refer to any manufactured single component or multiple components. The storage medium may be located either in the computing device executing the machine-readable instructions, or remote from but accessible to the computing device (e.g., via a computer network) for execution.

In some examples, instructions 121-125 may be part of an installation package that, when installed, may be executed by processing resource 110 to implement the functionalities described herein in relation to instructions 121-125. In such examples, storage medium 120 may be a portable medium, such as a CD, DVD, or flash drive, or a memory maintained by a server from which the installation package can be downloaded and installed. In other examples, instructions 121-125 may be part of an application, applications, or component(s) already installed on a computing device 100 including processing resource 110. In such examples, the storage medium 120 may include memory such as a hard drive, solid state drive, or the like. In some examples, functionalities described herein in relation to FIGS. 1 and 2 may be provided in combination with functionalities described herein in relation to any of FIGS. 3A-4.

Figure 3A:
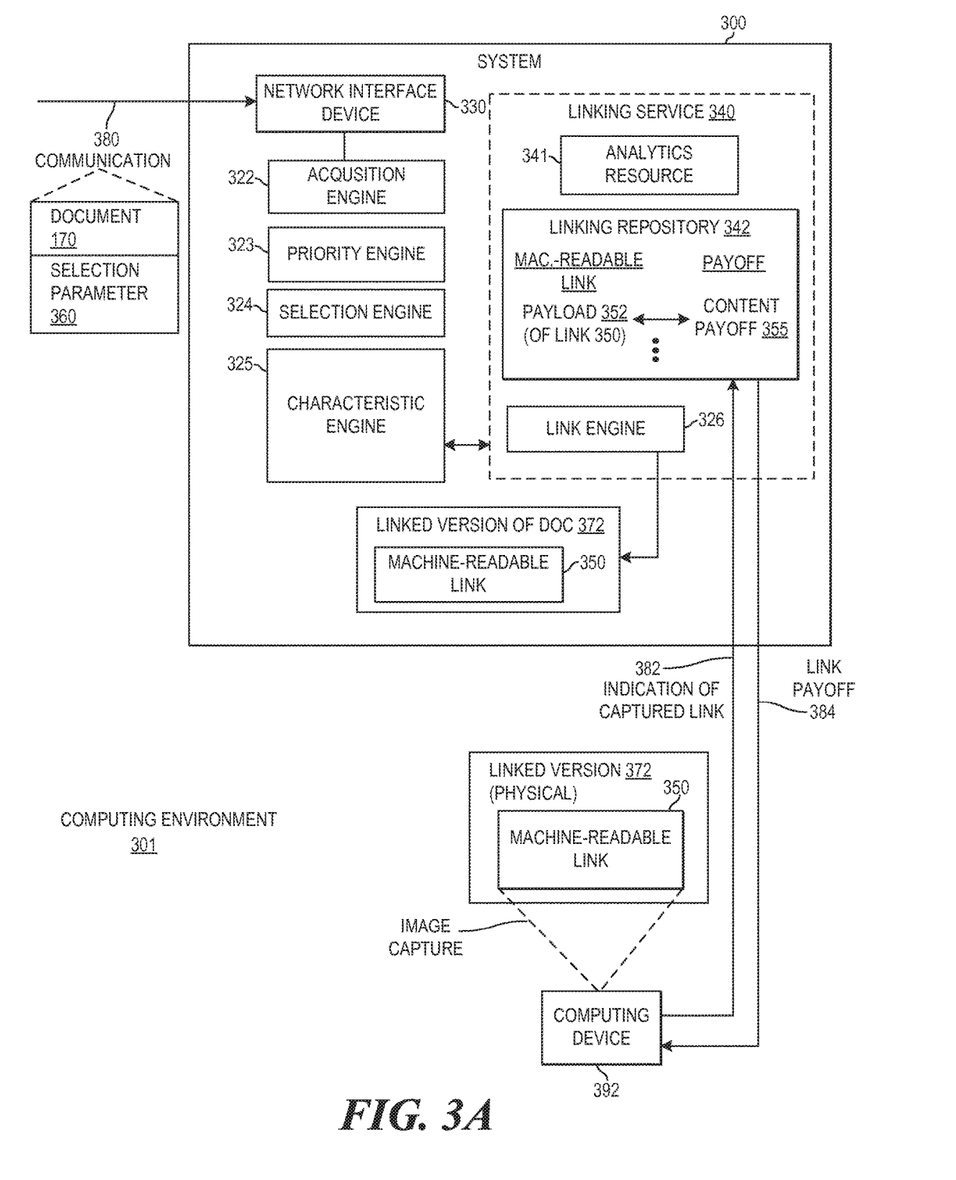
FIG. 3A is a block diagram of an example computing environment including an example system to prioritize, based on a selection parameter, at least one of a plurality of different types of machine-readable link available to be utilized with a document.

FIG. 3A is a block diagram of an example computing environment 301 including an example system 300 to prioritize, based on a selection parameter 360, at least one of a plurality of different types of machine-readable link available to be utilized with a document 170.

System 300 includes at least engines 322-326, which may be any combination of hardware and programming to implement the functionalities of the engines. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In such examples, the at least one machine-readable storage medium may store instructions that, when executed by the at least one processing resource, implement engines 322-326. In such examples, system 300 may include the at least one machine-readable storage medium storing the instructions and the at least one processing resource to execute the instructions, or one or more of the at least one machine-readable storage medium may be separate from but accessible to system 200 and the at least one processing resource (e.g., via a computer network).

In some examples, the instructions can be part of an installation package that, when installed, can be executed by the at least one processing resource to implement at least engines 322-326. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on system 300 including the processing resource. In such examples, the machine-readable storage medium may include memory such as a hard drive, solid state drive, or the like. In other examples, the functionalities of any engines of system 300 may be implemented in the form of electronic circuitry.

System 300 also includes a network interface device 330 and a linking service 340, which comprises an analytics resource, a linking repository 342, and a link engine 326. In the example of FIG. 3A, an acquisition engine 322 may actively or passively acquire, in at least one communication 380, a document 170 in an electronic format and a selection parameter 360 via network interface device 330 of system 300. System 300 may make a plurality of different types of machine-readable link available to be utilized with document 170, and may implement automated determination of which of the different types of machine-readable link to use with document 170 based on the content of document 170 and the selection parameter 360. In some examples, the different types of machine-readable link may include at least one type of barcode, digital watermarking, and an image fingerprinting.

In the example of FIG. 3A, selection parameter 360 may specify a preference to guide the automated determination of the type of machine-readable link to utilize. A priority engine 323 may prioritize at least one of the plurality of different types of machine-readable link available to be utilized with document 170 based on selection parameter 360. For example, selection parameter 360 may specify a preference to choose a type of machine-readable link based at least in part on popularity, such as the relative popularity of the plurality of different types of machine-readable link. In such examples, based on selection parameter 360 specifying a preference to choose based on popularity, priority engine 323 may access link type popularity data of an analytics resource 341 of linking service 340 and prioritize the most popular of the plurality of types of machine-readable link. For example, analytics resource 341 may maintain popularity data indicating the relative popularity of each of the types of machine-readable link based on, for example, how much each of the different types of machine-readable link are captured (e.g., scanned) for linking service 340 to resolve (e.g., and return payoff content). In such examples, engine 323 may determine and prioritize the most scanned type of machine-readable link. In some examples, the popularity data may be determined based on context (e.g., most popular for a given region, time, type of user, or the like, or a combination thereof).

In examples of selection parameter 360 specifying a popularity preference, priority engine 323 may prioritize a single type of machine-readable link to be selected for evaluation. In other examples, engine 323 may prioritize multiple types of machine-readable link to be selected for evaluation. Also, in some examples, non-prioritized types of machine-readable link may be evaluated for use when the evaluation metric(s) for each of the prioritized type(s) are determined not be satisfied. In other examples, the non-prioritized types may be eliminated from consideration such that they are not utilized with document 170 even when the evaluation metric(s) for each of the prioritized type(s) are determined not be satisfied.

In some examples, when selection parameter 360 specifies a popularity preference, priority engine 323 may prioritize a single type of machine-readable link to be selected for evaluation, and system may subsequently evaluate non-prioritized type(s) when the evaluation metric(s) are not satisfied for the prioritized type. In other examples, based on selection parameter 360 specifying another preference other than popularity, priority engine 323 may prioritize multiple of the types of machine-readable link and eliminate each non-prioritized type of machine-readable link from consideration, as described above.

Other preferences that may be specified include, for example, preferences based on monetary cost for use of the type of machine-readable link, whether the type of machine-readable link is covert or overt, whether the type of machine-readable link involves a modification of document 170, etc. For example, a selection parameter 360 based on monetary cost may specify a preference that cost be maintained below a given cost threshold. In some examples, when the cost of two-dimensional barcodes and image fingerprints are below the threshold, but the cost of digital watermarks is above the threshold, engine 323 may prioritize two-dimensional barcodes and image fingerprints, and eliminate digital watermarks from consideration. In another example, when a selection parameter 360 specifies a preference that covert types of machine-readable link not be used, engine 323 may prioritize digital watermarks and image fingerprints, and eliminate barcodes.

In the example of FIG. 3A, selection engine 324 may select one of the prioritized type(s) of machine-readable link for evaluation. In examples in which there is one prioritized type of machine-readable link, that type may be selected for evaluation. In examples in which multiple types are prioritized, engine 324 may select among the prioritized types on the bases described above in relation to FIGS. 1 and 2. For example, when overt and covert types of machine-readable link are among the prioritized types, engine 324 may determine whether document 170 is a textual-type document or an image-type document, and may select between the overt and covert types on that basis, as described above. In other examples, when digital watermarking and image fingerprinting are among the prioritized types, engine 324 may select between them based on image resolution, as described above.

A characteristic engine 325 may determine at least one characteristic of the content of document 170 and may decide whether the at least one characteristic satisfies at least one evaluation metric for use of the selected type of machine-readable link, as described above in relation to instructions 123 and 124 of FIG. 1. Based on the decision of whether the characteristic(s) satisfy the evaluation metric(s), characteristic engine 325 may instruct link engine 326 to produce a linked version of document 170 using the selected type of machine-readable link.

For example, when the selected type is an overt type of machine-readable link, such as a type of barcode, characteristic engine 325 may instruct link engine 326 to produce a linked version of document 170 including the overt type of machine-readable link when the characteristic(s) satisfy the metric(s) for the overt type of machine-readable link. In response (i.e., based on the selected type being the over type and the characteristic(s) satisfying the metric(s)), link engine 326 may create a linked version 372 of document 170 comprising an instance of the overt type of machine-readable link 350 through which associated payoff content 355 is accessible via optically capturing machine-readable link 350 (e.g., with computing device 392). In such examples, link engine 326 may create an instance of the overt machine-readable link which encodes a payload 352 and may create the linked version 372 of the document by adding the created instance of the link 350 to the original document 170 and registering the payload 352 in inking repository 342 such that it may be associated with a content payoff 355.

In such examples, a computing device 392 remote from linking service 340 (e.g., remote from at least system 300)

may capture (e.g., with an image capture device such as a digital camera or the like) an image of the instance of machine-readable link 350 from a physical (e.g., printed) copy of linked version 372. From the captured image, the computing device 392 may determine the payload 352 of link 350 (e.g., using machine-readable instructions executable to implement a reader application). In such examples, the computing device may provide an indication 382 that the computing device has captured an image of machine-readable link 350, which may include the payload 352 determined from link 350.

In response to indication 382, linking service 340 may determine the content payoff 355 assigned to payload 352 and provide computing device 392 access 384 to the content payoff 355. In examples described herein, a linking service may provide a computing device access to a digital content payoff by providing a copy of the digital content (e.g., a digital video file), by enabling the computing device to view, download, etc., a remote copy of the content (e.g., a digital video file stored remotely), by directing (or redirecting) the computing device to the content (e.g., directing a browser of the computing device to a URL that is the payoff), or in any other suitable manner.

In other examples, when the selected type is digital watermarking, characteristic engine 325 may instruct link engine 326 to produce a linked version of document 170 including a digital watermark when the characteristic(s) satisfy the metric(s) for the digital watermark. In response (i.e., based on digital watermarking being the selected type and the characteristic(s) satisfying the metric(s)), link engine 326 may create a linked version 372 of document 170 comprising a digital watermark 350 encoding a payload 352 such that associated payoff content 355 is accessible through linking service 340 via optically capturing the portion of linked version comprising the digital watermark 350 (e.g., with a computing device 392). In such examples, link engine 326 may modify document 170 to add the digital watermark 350 to it and register the payload 352 in linking repository 342 such that it may be associated with a content payoff 355, to thereby create the linked version 372.

In other examples, when the selected type is image fingerprinting, characteristic engine 325 may instruct link engine 326 to produce a linked version of document 170 having an image fingerprint 350 embodied therein when the characteristic(s) satisfy the metric(s) for the image fingerprint. In response (i.e., based on image fingerprinting being the selected type and the characteristic(s) satisfying the metric(s)), link engine 326 may create the linked version 372 by registering (e.g., linking) image fingerprint information 352 embodied by an image fingerprint 350 of document 170 in linking service 340 such that associated payoff content is accessible through the linking service via optically capturing an image of document 170 (e.g., with a computing device 392). In such examples, the linked version 372 is the same as the original document 170. In such examples, link engine 326 create the linked version 372 via the registering of the image fingerprint data and without modifying document 170.

As noted above, in some examples, non-prioritized types of machine-readable link are not eliminated. In such examples, based in part on the document not satisfying the at least one evaluation metric for the selected type, characteristic engine 325 may decide whether at least one characteristic of the content of the document satisfies at least one other evaluation metric for use of a non-prioritized type of machine-readable link. In such examples, based at least in part on the characteristic(s) satisfying the other evaluation metric(s) (i.e., in response to instruction from engine 325 on that basis), link engine 326 may create the linked version of document 170 using a machine-readable link of the non-prioritized type embodied in linked version 372 and such that associated payoff content 355 is accessible through linking service 340 via optically capturing at least a portion of the linked version of document 170.

In examples described herein, engines 322-325 may be implemented in the same computing device as at least a portion of linking service 340. In other examples, engines 322-325 and linking service 340 each may be implemented in computing device(s) separate but accessible to one another (e.g., via a computer network.) In some examples, functionalities described herein in relation to FIG. 3A may be provided in combination with functionalities described herein in relation to any of FIGS. 1-2 and 38-4.

Figure 3B:
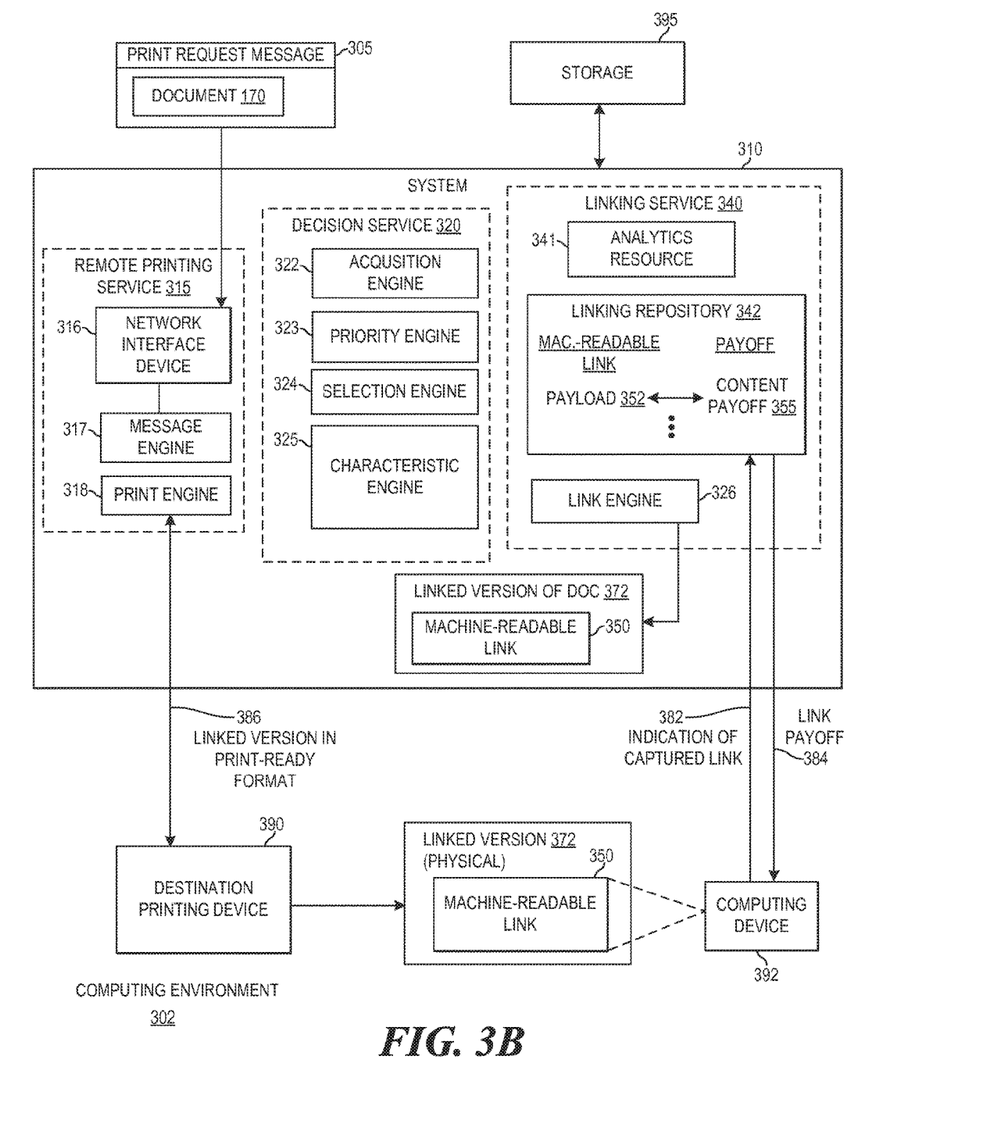
FIG. 3B is a block diagram of an example computing environment including an example system to decide, based on at least one characteristic of the content of a document, whether the document satisfies at least one evaluation metric for use of a selected type of machine-readable link.

FIG. 3B is a block diagram of an example computing environment 302 including an example system to decide, based on at least one characteristic of the content of a document, whether the document satisfies at least one evaluation metric for use of a selected type of machine-readable link. In the example of FIG. 3B, computing environment 302 includes a system 310 including a linking service 340, as described above in relation to FIG. 3A, a decision service 320, and a remote printing service 315. Decision service 320 includes engines 322-325, described above in relation to FIG. 3A. Components of FIG. 3B described above in relation to FIG. 3A may perform each of the functionalities described above in relation to FIG. 3A.

In examples described herein, a "remote printing service" may be a service implemented by one or more networked computing devices to receive, from a sending computing device, a message requesting that specified print content be printed at a destination printing device, and to make the specified print content available to the destination printing device a print-ready format, wherein the sending computing device and the printing device are each remote from the networked computing device(s) implementing the remote printing service. In examples described herein, a remote printing service may receive messages requesting printing from any of a plurality of different sending computing devices, and may make print content available to any of a plurality of different destination printing devices. In some examples, a message requesting printing may include the print content or may otherwise indicate (e.g., provide a reference to) the print content. In some examples, a message requesting printing may be an email message. In examples described herein, first device "remote" from a second device may be a first device that is separate from, and not directly connected to, the second device, wherein the first and second devices may access one another over a computer network.

In the example of FIG. 3B, remote printing service 315 is in communication with at least one destination printing device 390, as well as decision service 320 and linking service 340. In examples described herein, a "printing device" may be a hardware device, such as a printer, multifunction printer (MFP), three-dimensional (3D) printer, or any other device including at least functionalities to physically produce graphical representation(s) (e.g., text, images, etc.) on paper, other media, or the like. In some examples, an MFP may be capable of performing a combination of multiple different functionalities such as, for example, printing, photocopying, scanning, faxing, etc. In examples described herein, a printing device may be capable of communicating over a computer network, such as the internet, or the like. Such a printing device may be referred to herein as a "web-connected" printing device.

In the example of FIG. 3B, remote printing service 315 comprises a network interface device 316, a message engine 317, and a print engine 318. Each of engines 317 and 318 may be implemented as engines comprising any combination of hardware and programming to implement the functionalities of the engines, as described above. In some examples, services 315, 320, and 340 may be implemented, at least in part, on the same computing device. In other examples, services 315, 320, and 340 may each be implemented on computing device(s) separate from one another but in communication via at least one computer network. In the example of FIG. 3B, computing environment 302 may also include storage 395, which may be included in system 300 or remote from but accessible to system 300 (e.g., via a computer network). Storage 395 may be implemented by at least one machine-readable storage medium.

Operations of computing environment 302 of FIG. 3B will be described herein in relation to method 400 of FIG. 4. However, in some examples, system 310 of FIG. 3B may perform other methods different than method 400 of FIG. 4 or a subset of method 400, and method 400 of FIG. 4 may be performed by computing device(s) or system(s) other than system 310.

Figure 4:
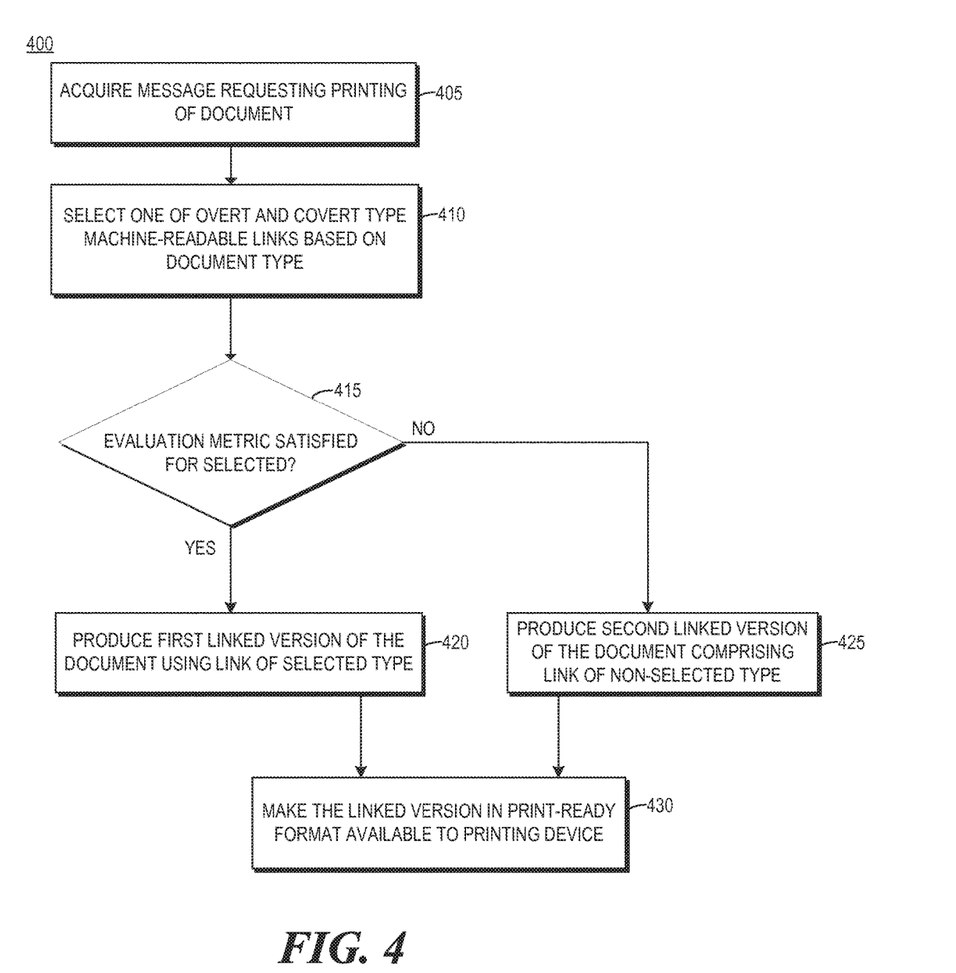
FIG. 4 is a flowchart of an example method for making available, to a destination printing device, a linked version of a document.

FIG. 4 is a flowchart of an example method 400 for making available, to a destination printing device, a linked version of a document. At 405 of method 400, message engine 317 of remote printing service 315 may actively or passively acquire, from a computer network and with network interface device 316, a message 305 requesting that an electronic document 170 included in message be printed. In some examples, the message 305 may specify a destination printing device 390 at which to print document 170. In some examples, message 305 may be an email message including document 170 in any suitable manner (e.g., as an attachment) and addressed to an email address assigned to destination printing device 390 in remote printing service 315. In such examples, this destination address may indicate, to remote printing service 315, that message 305 is a request to print. In other examples, message 305 may be any other suitable type of message, such as an application programming interface (API) function call.

Message engine 317 may provide document 170 to acquisition engine 322 of decision service 320 for automated determination of a type of machine-readable link to use with document 170. At 410 of method 400, selection engine 324 may select one of an overt type and a covert type of machine-readable link based on whether document 170 is a textual-type document or an image-type document. In some examples, prior to selection, priority engine 323 may prioritize at least one type of machine-readable link based on a selection parameter, as described above.

At 415, characteristic engine 325 may decide whether characteristics of the content of document 170 satisfy evaluation metric(s) for use of the selected type of machine-readable link, as described above. Based on the characteristic(s) satisfying the metric(s), at 420, link engine 326 may producing a linked version of document 170 using a machine-readable link of the selected type embodied in the linked version such that associated payoff content 355 is accessible to a computing device 392 through linking service 340 via optically capturing at least a portion of the linked version, as described above.

For example, when the selected type is an overt type of machine-readable link or digital watermarking, producing the linked version 372 may include adding the selected type of machine-readable link to the acquired electronic document to create the linked version 372 of document 170, as described above. In other examples, the linked version 372 may be created with an image fingerprint embodied therein, as described above.

In other examples, based at least in part on the characteristic(s) not satisfying the metric(s), at 425 link engine 326 may produce a second linked version of document 170 using a machine-readable link of the non-selected type embodied in the second linked version. For example, when the selected type is a covert type machine-readable link and the metric(s) are not satisfied, producing the linked version with the non-selected type includes engine 325 determining whether other characteristics of the content satisfy a watermarking evaluation metric. If so, then engine 326 may produce the second linked version with a digital watermark as described above. If not, then engine 325 may determine whether still other (i.e., different) characteristics satisfy a fingerprinting evaluation metric. Based in part on the different characteristics satisfying the fingerprinting evaluation metric, link engine 326 may link the acquired electronic document 170 in linking service 340 via an image fingerprint of the acquired electronic document, by, for example, registering image fingerprint information for the document in linking repository 342, as described above. In such examples, the second linked version is the same as the acquired electronic document 170.

At 430 of method 400, print engine 318 may make available, to destination printing device 390 via a computer network, the produced first or second linked version of document 170 in a print-ready format 386 for destination printing device 390. In some examples, print engine 318 may acquire the linked version from link engine 326 and convert (e.g., render) the linked version into the print-ready format, if it is not acquired in the print-ready format In some examples, remote printing service 315, in response to message 305, may store a copy of document 170 in storage 395. In such examples, the content payoff 355 may be a reference (e.g., address, etc.) to the document 170 stored in storage 395. In such examples, after destination printing device 390 prints linked version 372 including machine-readable link 350, by capturing an image of at least a portion of the linked version 372, computing device 392 may obtain access to content payoff 355 through which it may access the stored electronic version of document 170 in storage 390. In such examples, system 300 may select, without user intervention, a suitable type of machine-readable link with which to link a printed version of a document 170 to a stored electronic version of the document 170.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3B. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. An article comprising at least one non-transitory machine-readable storage medium comprising instructions executable by a processing resource of a computing device to:

acquire, via a network interface device, a document in an electronic format;

select, based whether the document is a textual-type or an image-type document, one of an overt type and a covert type of machine-readable link for evaluation;

determine, with the computing device, characteristics of the content of the document, including a tonal distribution for the content when the selected type is a digital watermark;

decide whether the characteristics satisfy an evaluation metric for use of the selected type of machine-readable link;

based on satisfaction of the evaluation metric, determine to produce a first linked version of the document using a machine-readable link of the selected type embodied in the first linked version; and based at least in part on non-satisfaction of the least one evaluation metric, determine to produce a second linked version of the document using a machine-readable link of the non-selected type embodied in the second linked version.

2. The storage medium of claim 1, wherein the instructions to select comprise instructions to:

select the overt type of machine-readable link for evaluation based on the document being a textual-type document.

3. The storage medium of claim 2, wherein:

the instructions to decide comprise instructions to determine whether dimensions of an area of white space in a margin of the content of the document are at least as large as target dimensions for a barcode, when the selected type is a barcode; and the instructions to determine to produce the first linked version comprise instructions to determine to produce a first linked version of the document comprising a barcode at a determined area of the document and through which associated payoff content is accessible through a linking service via optically capturing the barcode in the first linked version.

4. The storage medium of claim 3, wherein the instructions to determine to produce the second linked version comprise instructions to:

based on the respective dimensions of areas of white space in the margins of the content of the document being smaller than the target dimensions, determine to produce the second linked version of the document comprising a digitally watermarked region of greyscale tint through which associated payoff content is accessible through the linking service via optically capturing the digitally watermarked region.

5. The storage medium of claim 1, wherein the instructions to select comprise instructions to:

select the covert type of machine-readable link for evaluation based at least in part on the document being an image-type document.

6. The storage medium of claim 5, wherein:

the instructions to select comprise instructions to:
determine whether the content of the document satisfies a resolution evaluation metric; and the instructions to decide comprise instructions to:
based on the document satisfying the resolution evaluation metric, determine whether the characteristics of the content satisfy a watermarking evaluation metric; and based on the document not satisfying the resolution evaluation metric, determine whether the characteristics of the content satisfy a fingerprinting evaluation metric, wherein the first version is the acquired electronic document when the image fingerprinting evaluation metric is satisfied.

7. A system comprising:

an acquisition engine to acquire a document in an electronic format and a selection parameter;

a priority engine to prioritize, based on the selection parameter, at least one of a plurality of different types of machine-readable link available to be utilized with the document;

a selection engine to select one of the at least one prioritized type of machine-readable link for evaluation, wherein the selection is based at least in part on whether the document is a textual-type or an image-type document when overt and covert types of machine-readable link are among the prioritized types of machine-readable link; and a characteristic engine to decide whether at least one characteristic of the content of the document satisfies at least one evaluation metric for use of the selected type of machine-readable link; and a link engine to, based on the at least one characteristic satisfying the at least one evaluation metric and the selected type being the overt type of machine-readable link, create a linked version of the document comprising the overt type of machine-readable link through which associated payoff content is accessible via optically capturing the overt type of machine-readable link.

8. The system of claim 7, wherein the link engine is further to, based on the at least one characteristic satisfying the at least one evaluation metric and the selected type being a digital watermark, create the linked version of the document comprising the digital watermark such that associated payoff content is accessible through a linking service via optically capturing the portion of the linked version comprising the digital watermark.

9. The system of claim 7, wherein the link engine is included in a linking service and the link engine is further to, based on the at least one characteristic satisfying the at least one evaluation metric and the selected type being an image fingerprint, create the linked version by linking an image fingerprint of the document in the linking service such that associated payoff content is accessible through the linking service via optically capturing an image of the document, wherein the linked version is the acquired electronic document.

10. The system of claim 7, wherein:

the characteristic engine is to, based in part on the at least one characteristic not satisfying the at least one evaluation metric, decide whether other characteristics of the content satisfy at least one other evaluation metric for use of a non-prioritized type of machine-readable link; and the link engine is to, based at least in part on the other characteristics satisfying the at least one other evaluation metric, create the linked version of the document using a machine-readable link of the non-prioritized type embodied in the linked version and such that associated payoff content is accessible through the linking service via optically capturing the linked version of the document.

11. The system of claim 10, wherein:

based on the selection parameter specifying a preference to choose based on popularity, the priority engine is to access link type popularity data of an analytics resource and prioritize the most popular of the plurality of types of machine-readable link.

12. The system of claim 11, wherein:
based on the selection parameter specifying another preference, the priority engine is further to prioritize multiple of the types of machine-readable link and eliminate each non-prioritized type of machine-readable link; and
the plurality of different types of machine-readable link comprise at least one type of barcode, digital watermarking, and image fingerprinting.

13. A method comprising:
acquiring, with a network interface device, a message requesting that an electronic document included in the message be printed;
based at least in part on whether the document is a textual-type document or an image-type document, selecting, with a selection engine, one of an overt type and a covert type of machine-readable link for evaluation;
deciding whether characteristics of the content of the document satisfy at least one evaluation metric for use of the selected type of machine-readable link;
based on the characteristics satisfying the at least one evaluation metric, producing a first linked version of the document using a machine-readable link of the selected type embodied in the first linked version and such that associated payoff content is accessible through a linking service via optically capturing at least a portion of the first linked version; and
producing, based at least in part on the characteristics not satisfying the at least one evaluation metric, a second linked version of the document using a machine-readable link of the non-selected type embodied in the second linked version; and
making available, to a destination printing device via a computer network, the produced first or second linked version of the document in a print-ready format for the destination printing device.

14. The method of claim 13, wherein, when the selected type is an overt type of machine-readable link or digital watermarking, producing the first linked version comprises:
adding the selected type of machine-readable link to the acquired electronic document to create the first linked version of the document.

15. The method of claim 13, wherein the selected type is an overt type of machine-readable link, and the producing the second linked version further comprises:
determining whether other characteristics of the content satisfy a watermarking evaluation metric;
based on the other characteristics not satisfying the watermarking evaluation metric, determining whether different characteristics of the content satisfy a fingerprinting evaluation metric; and
based in part on the different characteristics satisfying the fingerprinting evaluation metric, linking the acquired electronic document in the linking service via an image fingerprint of the acquired electronic document, wherein the acquired electronic document is the second linked version of the document.

* * * * *